(12) United States Patent
Lv et al.

(10) Patent No.: US 10,508,378 B2
(45) Date of Patent: Dec. 17, 2019

(54) VIBRATION-DAMPING COMPONENT OF WASHING MACHINE

(71) Applicant: QINGDAO HAIER WASHING MACHINE CO., LTD., Qingdao, Shandong (CN)

(72) Inventors: Peishi Lv, Shandong (CN); Lin Yang, Shandong (CN); Yun Tian, Shandong (CN); Gangjin Zhang, Shandong (CN); Mingyan Shao, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 80 days.

(21) Appl. No.: 15/748,272

(22) PCT Filed: Jul. 26, 2016

(86) PCT No.: PCT/CN2016/091744
§ 371 (c)(1),
(2) Date: Jan. 29, 2018

(87) PCT Pub. No.: WO2017/020754
PCT Pub. Date: Feb. 9, 2017

(65) Prior Publication Data
US 2018/0163335 A1    Jun. 14, 2018

(30) Foreign Application Priority Data
Jul. 31, 2015    (CN) .......................... 2015 1 0468164

(51) Int. Cl.
*D06F 37/20*    (2006.01)
*D06F 39/00*    (2006.01)
(Continued)

(52) U.S. Cl.
CPC ............. *D06F 37/203* (2013.01); *D06F 39/00* (2013.01); *F16F 7/085* (2013.01); *F16F 15/03* (2013.01)

(58) Field of Classification Search
CPC ........ D06F 37/203; D06F 37/24; D06F 39/00; D06F 39/003; F16F 7/085; F16F 15/03
(Continued)

(56) References Cited

U.S. PATENT DOCUMENTS

2004/0261469 A1    12/2004    Park et al.

FOREIGN PATENT DOCUMENTS

| CN | 2680704 Y | 2/2005 |
| CN | 1621599 A | 6/2005 |

(Continued)

OTHER PUBLICATIONS

CN204401312U—Machine Translation (Year: 2015).*
(Continued)

*Primary Examiner* — Michael E Barr
*Assistant Examiner* — Tinsae B Ayalew
(74) *Attorney, Agent, or Firm* — Buchanan Ingersoll & Rooney PC

(57) ABSTRACT

A vibration-damping component of a washing machine comprises a suspender, a spring, a sleeve and an electromagnetic sensing device. The electromagnetic sensing device comprises an electromagnetic coil and a magnet. The electromagnetic coil surrounds the sleeve, the magnet and the spring are arranged in the sleeve and are fixed on the suspender, the sleeve surrounds the suspender in a slidable manner, and the weight of clothing is determined through measuring magnetic flux change of the electromagnetic coil when the sleeve slides on the suspender. In addition, the magnet and the electromagnetic coil make relative displacement, inductance in the electromagnetic coil changes, and water inflow can be detected through detecting the inductance. When dewatering begins, the vibratory magnitude of an outer drum is determined through the inductance change
(Continued)

of the electromagnetic coil, and the stability of dewatering operation of the washing machine can be controlled accordingly.

7 Claims, 3 Drawing Sheets

(51) Int. Cl.
*F16F 7/08* (2006.01)
*F16F 15/03* (2006.01)

(58) Field of Classification Search
USPC .......................................................... 68/23.1
See application file for complete search history.

(56) References Cited

FOREIGN PATENT DOCUMENTS

| | | |
|---|---|---|
| CN | 1690291 A | 11/2005 |
| CN | 103866537 A | 6/2014 |
| CN | 204401312 U | 6/2015 |
| CN | 104762790 A | 7/2015 |
| EP | 2 312 179 A1 | 4/2011 |

OTHER PUBLICATIONS

International Search Report (PCT/ISA/210) dated Oct. 19, 2016, by the State Intellectual Property Office of the P.R. China as the International Searching Authority for International Application No. PCT/CN2016/091744.

Written Opinion (PCT/ISA/237) dated Oct. 19, 2016, by the State Intellectual Property Office of the P.R. China as the International Searching Authority for International Application No. PCT/CN2016/091744.

\* cited by examiner

VIBRATION-DAMPING COMPONENT OF WASHING MACHINE

TECHNICAL FIELD

The present disclosure relates to vibration-damping components, particularly relates to a vibration-damping component of a washing machine and belongs to the field of devices of washing machines.

BACKGROUND

A vibration-damping component of a traditional washing machine only play a role in damping vibration of the washing machine during the dewatering of the washing machine and does not have other extensive functions. During the use of the washing machine, a vibration-damping component with weighing and sensing functions is required in order to determine water inflow amount according to the weight of clothing and meanwhile to carry out detection and control on vibration of an outer drum when the washing machine begins to perform dewatering.

In view of this, the present disclosure is provided.

SUMMARY

A technical problem to be solved by the present disclosure is to overcome the defects in the prior art and provide a vibration-damping component of a washing machine. The vibration-damping component of the washing machine can be used for damping vibration of an outer drum of the washing machine.

In order to solve the technical problem described above, a basic concept of a technical solution of the present disclosure is as follows: a vibration-damping component of a washing machine comprises a suspender, a spring, a sleeve and an electromagnetic sensing device. The electromagnetic sensing device comprises an electromagnetic coil and a magnet, the electromagnetic coil fixedly sleeves on the outer side of the sleeve, the magnet is arranged in the sleeve and is relatively fixed on the suspender. The sleeve sleeves on the suspender in a slidable manner, the spring is arranged between the sleeve and the magnet, and the weight of clothing is determined through measuring the inductance change of the electromagnetic coil when the sleeve slides on the suspender under stress.

Further, a base is fixedly arranged at the lower end of the suspender, the base supports the spring and the magnet.

Further, the vibration-damping component further comprises a sliding cup, the sliding cup is arranged between the base and the magnet, and the sliding cup is annular and sleeves on the suspender, a diameter of the sliding cup is matched with the inside diameter of the sleeve.

Further, the magnet is a shape of barrel with a bottom, the bottom of the magnet has a center through hole, and the bottom of the magnet supports the spring.

Further, the bottom of the magnet is a shape of boss with a center through hole, the magnet sleeves on the suspender through the center through hole, and a step face of the magnet supports the spring.

Further, the lower end of the spring abuts against the internal face of the bottom of the magnet and is supported by the bottom of the magnet.

Further, the lower end of the spring sleeves on a middle part of the magnet, and the lower end of the spring and the middle part of the magnet are in close fit.

Further, a center part of the base penetrates through a center part of the sliding cup and a center part of the magnet.

Further, the spring is spindle-shaped, inside diameters of the two ends of the spring are smaller, the inside diameter of a middle part of the spring is larger, and thus, the friction between the spring and the magnet during compression is prevented.

After adopting the above-mentioned technical scheme, as compared with the prior art, the present disclosure has the following beneficial effects.

According to the vibration-damping component of the washing machine, provided by the present disclosure, a suspender seat is arranged at one end of the suspender, the sleeve sleeves on the other end of the suspender. The end of the suspender, where the suspender seat is arranged, is connected with the casing of the washing machine; the end of the suspender, where the sleeve sleeves, is connected with the outer drum of the washing machine, and the outer drum of the washing machine is suspended in the casing via the suspender. Before the washing machine begins to work, pre-weighing is carried out firstly by the vibration-damping component of the washing machine, and weighing is carried out again after clothing is put into the washing machine by users. The inner drum of the washing machine and the outer drum of the washing machine are connected together, the outer drum applies a force to the sleeve, the sleeve slides relative to the suspender, then, the electromagnetic coil and the magnet perform relative motions, thus, magnetic flux in the electromagnetic coil changes, inductance in the electromagnetic coil changes, and a computer program controller judges the weight of the clothing according to the inductance change and determines the volume of water inflow. When water enters the inner drum of the washing machine, as the inner drum and the outer drum are connected together, the pressure that the outer drum applies on the sleeve is increased and then the spring is compressed, the sleeve slides relative to the suspender, then, the magnet and the electromagnetic coil, which are fixed on the suspender and the sleeve respectively, make relative displacement, the magnetic flux passing through the electromagnetic coil changes, the inductance in the electromagnetic coil changes, and the computer program controller judges the weight of clothing and controls the volume of water inflow according to the inductance change. When dewatering of the washing machine begins, the outer drum
generate vibration, energy of vibration is absorbed through the deformation of the spring to achieve vibration damping, the vibratory magnitude of the outer drum is determined through detecting the inductance change of the electromagnetic coil, the washing machine is controlled by the computer program controller to carry out adjustment, and the stability of dewatering operation of the washing machine is ensured.

The specific embodiments of the present disclosure are further described in detail below with reference to the drawings.

Reference Signs: 1—suspender seat, 2—suspender, 3—sleeve, 4—spring, 5—magnet, 6—electromagnetic coil, 7—conductor, 8—sliding cup, and 9—base.

DETAILED DESCRIPTION

Embodiment I

A vibration-damping component of a washing machine comprises a suspender, a spring, a sleeve and an electromagnetic sensing device. The electromagnetic sensing device comprises an electromagnetic coil and a magnet, and the upper end of the suspender is connected with a casing of the washing machine. In this embodiment, in order to better connect the suspender and the casing of the washing machine, a suspender seat is arranged at the upper end of the suspender and is connected with a snap ring of the internal wall of the casing of the washing machine; wherein, the snap ring supports the suspender seat, and thus, the suspender is connected with the casing of the washing machine. The sleeve sleeves on the lower part of the suspender, one end of the suspender, where the sleeve sleeves, is connected with a suspending seat on an outer drum. A part of the sleeve, located below the suspending seat, supports the suspending seat. The outer drum of the washing machine is suspended in the casing by using four vibration-damping components of the washing machine provided by the present disclosure.

The magnet is arranged in the sleeve and is relatively fixed on the suspender, the sleeve sleeves on the suspender in a slidable manner, and the electromagnetic coil fixedly sleeves on the outer side of the sleeve. The spring is arranged between the magnet and the sleeve, the lower end of the spring presses the magnet by using an elastic force of the spring, thus, the magnet and the suspender is relatively static. The sleeve sleeves on the suspender in a slidable manner, when the sleeve slides on the suspender under stress, inductance of the electromagnetic coil changes, and the change of the inductance is measured by a control program of a computer program controller of the washing machine to determine the weight of clothing.

Figure 3:
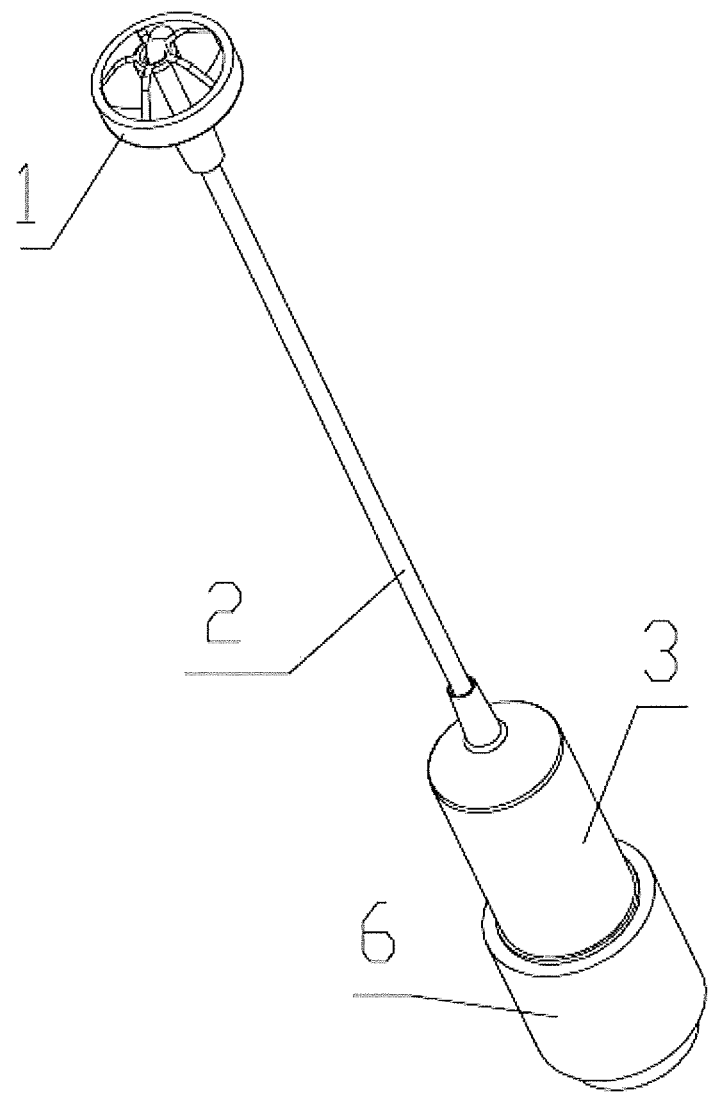
FIG. 3 is a structural schematic diagram of a vibration-damping component of a washing machine of the present disclosure.

In this embodiment, the magnet and the suspender are fixedly arranged. Referring to FIG. 3, the electromagnetic coil fixedly sleeves on the outer side of the sleeve. In other embodiments, the electromagnetic coil and the suspender may be fixedly arranged, and the magnet and the sleeve may be fixedly arranged.

The sleeve sleeves the suspender in a slidable manner, the spring is a compression spring. The spring sleeves on the suspender and is located in an internal cavity of the sleeve, the lower end of the suspender is in contact with the lower end of the spring and supports the spring, the upper end of the spring is in contact with the top of an internal cavity wall of the sleeve, and thus, the upper end of the spring is always in the internal cavity of the sleeve.

Figure 1:
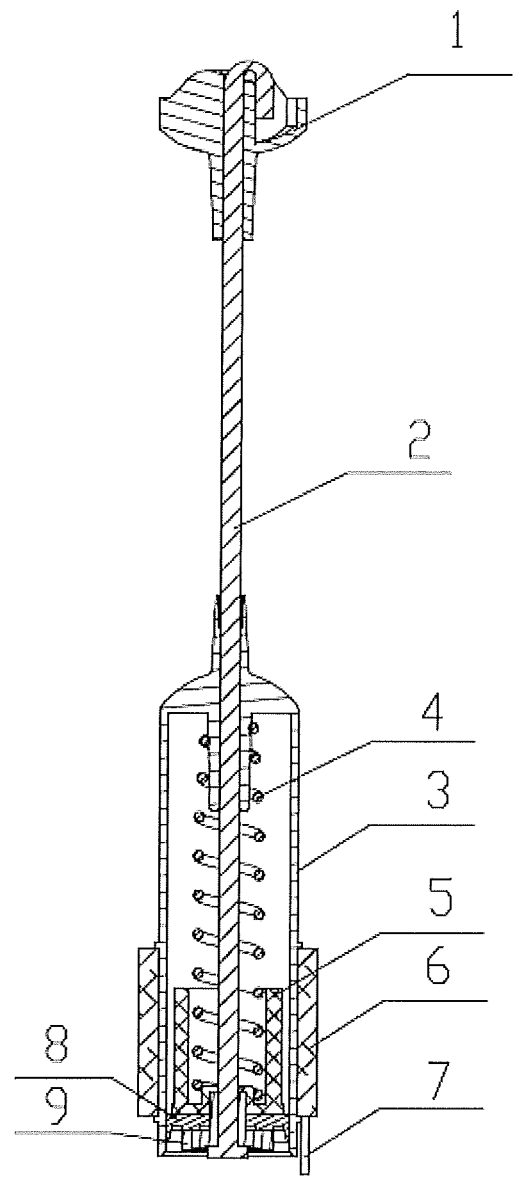
FIG. 1 is a structural schematic diagram of a vibration-damping component of a washing machine in Embodiment I of the present disclosure.

Referring to FIG. 1, in this embodiment, the magnet is arranged in the sleeve, and the spring is arranged between the magnet and the sleeve.

In order to better support the spring and the magnet, a base is fixedly arranged at the lower end of the suspender and supports the spring and the magnet.

A sliding cup is arranged at the lower end of the suspender. In this embodiment, the sliding cup is located above the base and below the spring and the magnet. The sliding cup is annular and sleeves on the suspender, and the outside diameter of the sliding cup is matched with the inside diameter of the sleeve. When the suspender and the sleeve slide relatively, the sliding cup acts together with the suspender and exerts a certain damping function, and thus, collision between the lower end of the suspender and the base and between the magnet and the sleeve caused by the offsetting of the suspender is prevented.

Referring to FIG. 1, the magnet is a shape of barrel with a bottom, the bottom of the magnet has a center through hole. The magnet sleeves on the suspender, the spring sleeves on the suspender and the lower end of the spring is located in a barrel internal cavity of the magnet. The bottom of the magnet supports the spring, the center of the upper surface of the bottom of the magnet has an annular boss, and the lower end of the spring is located at the outer periphery of the annular boss. The sliding cup is sandwiched between the magnet and the base.

The electromagnetic coil is connected with a signal receiver through a conductor, and the signal receiver is connected with the computer program controller.

Before the washing machine begins to work, pre-weighing is carried out firstly by using the vibration-damping component, and weighing is carried out again after clothing is put into the washing machine by users. The weight of clothing is determined through twice weighing, and then, the volume of water inflow required is judged according to the weight of the clothing. When water enters an inner drum of the washing machine, the weight of the inner drum increases due to the water, the outer drum downwards presses the sleeve, the sleeve downwards slides slowly along the suspender due to the action of the spring, the magnet on the suspender and the electromagnetic coil on the sleeve perform relative motions, the inductance of the electromagnetic coil changes. The inductance change of the electromagnetic coil is output to the signal receiver for filtering rectification and signal amplification and then is output to the computer program controller. The computer program controller judges the displacement of the magnet according to the number of wave forms in the same time, and thus, the volume of water inflow is detected and controlled.

When dewatering of the washing machine begins, the outer drum vibrates, energy of vibration is absorbed through the deformation of the spring to achieve vibration damping. Besides, the size of vibration of the outer drum of the washing machine is known through detecting the inductance change of the electromagnetic coil, the control program of the computer program controller of the washing machine is used for carrying out load error correcting, thus, the stability of dewatering operation of the washing machine is improved, the use requirements of the users are met, and the use experience is improved.

It should be understood that a relationship between a relative motion relationship between the electromagnetic coil and the magnet and the inductance change of the electromagnetic coil is known through experiments, and a relationship between the relative motion relationship between the electromagnetic coil and the magnet and an external force on the sleeve is also known through experiments.

According to the vibration-damping component of the washing machine, provided by the present disclosure, one end of the suspender, where the suspender seat is arranged, is connected with the casing of the washing machine; one end of the suspender, where the sleeve sleeves, is connected with the outer drum of the washing machine, and the outer drum of the washing machine is suspended in the casing. Before the washing machine begins to work, pre-weighing is carried out firstly by the vibration-damping component of the washing machine, and weighing is carried out again after clothing is put into the washing machine by users. The inner drum of the washing machine and the outer drum of the washing machine are connected together, the outer drum applies a force on the sleeve, the sleeve slides relative to the suspender, then, the electromagnetic coil and the magnet perform relative motions, thus, magnetic flux in the electromagnetic coil changes, inductance in the electromagnetic coil changes, and the computer program controller judges the weight of the clothing according to the inductance change and determines the volume of water inflow. When water enters the inner drum of the washing machine, as the inner drum and the outer drum are connected together, the pressure that the outer drum applies on the sleeve is increased and then the spring is compressed, the sleeve slides relative to the suspender, then, the magnet and the electromagnetic coil, which are fixed on the suspender and the sleeve respectively, make relative displacement, the magnetic flux passing through the electromagnetic coil changes, the inductance in the electromagnetic coil changes, and the computer program controller judges and controls the volume of water inflow according to the inductance change. When dewatering of the washing machine begins, the outer drum generates vibration, energy of vibration is absorbed through the deformation of the spring to achieve vibration damping, the size of vibration of the outer drum of the washing machine is known through detecting the inductance change of the electromagnetic coil, the control program of the computer program controller of the washing machine is used for carrying out load error correcting, a rate of revolution of a motor is regulated, and thus, the stability of dewatering operation of the washing machine is improved.

Embodiment II

Figure 2:
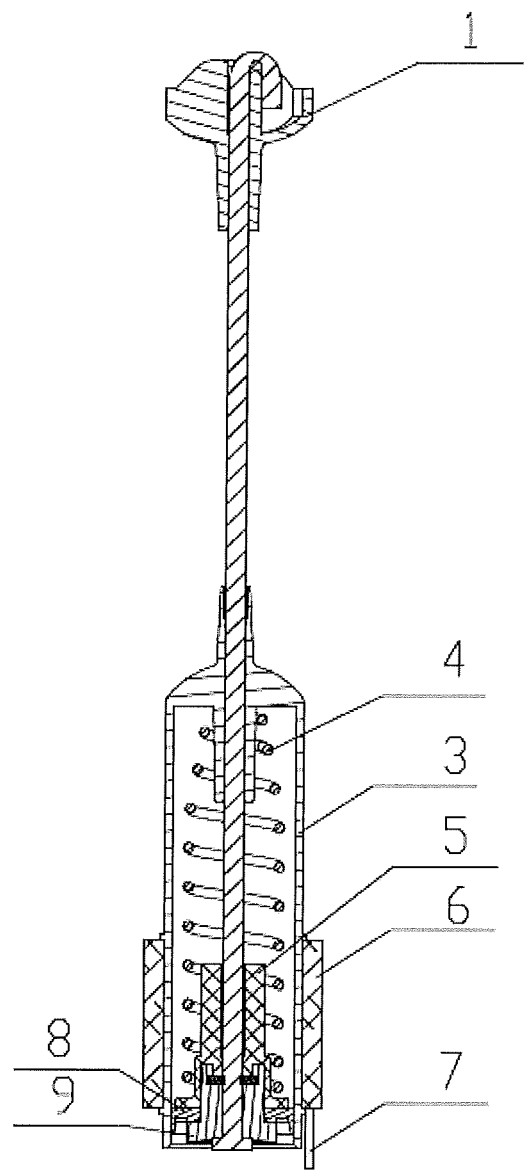
FIG. 2 is a structural schematic diagram of a vibration-damping component of a washing machine in Embodiment II of the present disclosure.

Referring to FIG. 2, the difference between this embodiment and Embodiment I lies in that: the magnet is located in a columnar space formed by the spring and is arranged in a manner that the magnet and the suspender are relatively fixedly arranged.

The bottom of the magnet is a shape of boss with a center through hole, a step face of the magnet supports the spring, and a sliding cup is sandwiched between the magnet and a base.

The magnet is divided into three parts with different outside diameters along the axial direction of the magnet, and the outside diameters of the three parts sequentially increase from top to bottom. The outside diameter of the topmost part of the magnet is minimum, and the outside diameter of the bottommost part of the magnet is maximum.

The lower end of the spring abuts against the internal face of the bottom of the magnet and is supported by the bottom of the magnet. The lower end of the spring sleeves on a middle part of the magnet, and the lower end of the spring and the middle part of the magnet are in close fit. The lower end of the spring presses the magnet, and thus, the magnet and the suspender is relatively static.

The magnet is divided into the three parts, the lower end of the spring sleeves on the middle part of the magnet, i.e., the second part of the magnet, and the lower end of the spring and the middle part of the magnet are in close fit, so that the lower end of the spring is stuck at the periphery of the second part of the magnet, and thus, the spring cannot slosh along the radial direction. The outside diameter of the topmost part of the magnet is smaller than that of the middle part of the magnet, so that a gap is present between the topmost part of the magnet and the spring, friction is absent between the topmost part of the magnet and the spring when the spring is compressed or stretched, and thus, the magnet is prevented from abrasion.

The spring is spindle-shaped, inside diameters of the two ends of the spring are smaller, and the inside diameter of the middle part of the spring is larger. Due to such structural design of the spring, the friction between the spring and the magnet can be better prevented.

A center part of the base penetrates through the sliding cup and supports the bottom of the center of the magnet.

Implementation schemes in the above-mentioned embodiments can be further combined or replaced, the embodiments are only used for describing preferred embodiments of the present disclosure, but not intended to limit the conception and scope of the present disclosure, and all kinds of variations and improvements on the technical scheme of the present disclosure made by those skilled in the art without departing from the design concept of the present disclosure all fall within the protection scope of the present disclosure.

The invention claimed is:

1. A vibration-damping component of a washing machine comprising a suspender, a spring, a sleeve and an electromagnetic sensing device,
   wherein the electromagnetic sensing device comprises an electromagnetic coil and a magnet,
   the electromagnetic coil fixedly sleeves on an outer side of the sleeve,
   the magnet is arranged in the sleeve and is relatively fixed on the suspender,
   the sleeve sleeves on the suspender in a slidable manner,
   the spring is arranged between the sleeve and the magnet,
   and a weight of clothing is determined through measuring an inductance change of the electromagnetic coil when the sleeve slides on the suspender under stress,
   a base is fixedly arranged at a lower end of the suspender, the base supports the spring and the magnet,
   the vibration-damping component further comprising a sliding cup, the sliding cup is arranged between the base and the magnet,
   the sliding cup is annular and sleeves on the suspender, and
   a diameter of the sliding cup is matched with an inside diameter of the sleeve.

2. The vibration-damping component of the washing machine according to claim 1, wherein, the magnet is a shape of barrel-with a bottom, the bottom of the magnet has a center through hole, and the bottom of the magnet supports the spring.

3. The vibration-damping component of the washing machine according to claim 1, wherein, a bottom of the magnet is a shape of boss with a center through hole, the magnet sleeves on the suspender through the center through hole, and a step face of the magnet supports the spring.

4. The vibration-damping component of the washing machine according to claim 3, wherein, a lower end of the spring abuts against an internal face of the bottom of the magnet and is supported by the internal face of the bottom of the magnet.

5. The vibration-damping component of the washing machine according to claim 4, wherein, the lower end of the spring sleeves on a middle part of the magnet, and the lower end of the spring and the middle part of the magnet are in close fit.

6. The vibration-damping component of the washing machine according to claim 4, wherein, a center part of the base penetrates through a center part of the sliding cup and to a center part of the magnet.

7. The vibration-damping component of the washing machine according to claim 5, wherein, the spring is spindle-shaped, inside diameters of the two ends of the spring are smaller, the inside diameter of a middle part of the spring is larger, the friction between the spring and the magnet during compression is avoided.

\* \* \* \* \*